United States Patent Office.

DONITRY ALEXANDROWITCH PÉNIAKOFF, OF SELZAETE, BELGIUM.

PROCESS OF MAKING ALKALINE ALUMINATES.

SPECIFICATION forming part of Letters Patent No. 603,657, dated May 10, 1898.

Application filed December 15, 1897. Serial No. 662,059. (No specimens.) Patented in France November 16, 1895, No. 251,758; in England November 19, 1895, No. 22,038; in Germany November 20, 1895, No. 93,952, and in Belgium April 1, 1896, No. 120,667.

*To all whom it may concern:*

Be it known that I, DONITRY ALEXANDROWITCH PÉNIAKOFF, a subject of the Emperor of Russia, residing at Selzaete, in the Kingdom of Belgium, have invented certain new and useful Improvements in the Art of Preparing Aluminates, (for which I have obtained Letters Patent in the following countries: France, November 16, 1895, No. 251,758; Great Britain, November 19, 1895, No. 22,038; Belgium, April 1, 1896, No. 120,667; Germany, November 20, 1895, No. 93,952,) of which the following is a specification.

This invention relates to the art of preparing aluminates, and particularly the aluminates of the alkalies and alkaline earths, with special reference to the employment as starting materials for this purpose of the aluminous earths—such, for example, as bauxite—and sulfate of alkalies or alkaline earths.

The object of the invention is to produce aluminates which will be free from and uncontaminated with sulfids of iron and the like, which discolor them and render them commercially valueless and unfit for the uses to which they are to be applied.

As will be seen from the following description, the invention with this object in view consists, essentially, in adding to a mixture of aluminous matter and a sulfate or sulfates a quantity of carbonaceous matter—such as coke, pit-coal, wood-charcoal, or the like—which shall contain substantially only one-fourth the amount of carbon necessary to completely reduce the sulfate, or, in other words, to combine with the oxygen contained in the sulfate to form carbon dioxid, and in subsequently calcining such mixture; and my invention consists in such further features, steps, and methods as will be hereinafter described, and pointed out in the claims appended to the specification.

Repeated attempts have been made to obtain aluminates by subjecting mixtures of the initial or starting products above referred to to the process of calcination. All methods suggested with a view to attain this result may be divided into those in which during the calcination the sulfur of the sulfate is converted into sulfids and into those in which the said sulfur is partly converted into sulfids and partly into sulfurous-acid gas. It has, however, been generally found that by both these methods of proceeding, owing to the continuous presence of compounds of iron formed and contained in the aluminous earths in question which are poor in silica, only green or black colored aluminiate lyes are obtained which contain ferrous sulfid, and thus become entirely worthless. It was also due to this fact that in spite of repeated attempts having been made none of these methods have been practically utilized. I therefore was led and made it my task to more closely examine the reactions which occur during the calcination and to find out whether the whole amount of sulfur contained in the sulfate can be converted into sulfurous-acid gas. I have succeeded in practically realizing this object, after having calculated in this way, that in order to facilitate the formation of the sulfurous acid only little oxygen must be withdrawn from the reacting mixture and that it is impossible to wholly convert the sulfur into sulfurous-acid gas as soon as a deficiency in oxygen has been caused, owing to the fact that the secondary reactions have developed too far. This result, however, regularly took place in all methods hitherto employed, owing to the fact, as discovered by me, that according to these said methods the amount of carbon was far too great, and that, moreover, the process was carried out in a highly-reducing atmosphere of burning gases. Under these conditions by far the greater part of the oxygen of the sulfate combined with carbon and, owing to the reduction being carried too far, only a portion of the sulfur was enabled to escape in form of sulfurous-acid gas, while the remainder of such sulfur remained in form of sulfid, which polluted the lyes. On the other hand, it is not possible to carry out the process without the addition of carbon, since the reaction of aluminous earth upon sulfates alone proceeds with extreme slowness. It is thus evident that in order to obtain the proper reactions it is of great importance that carbon be added.

I finally succeeded in carrying out the process in a reliable manner and as desired— namely, without the simultaneous formation of sulfids—my leading idea having been that in this reaction only a separation, as it were, of $Na_2SO_4$ into $Na_2O.SO_2$ and $O$ has to take place. Thus from each molecule $Na_2SO_4$ only one atom of oxygen is to be withdrawn, and if more oxygen be withdrawn therefrom the formation of sulfuret of sodium or of ferrosulfuret, respectively, (by a double change with ferrosulfuret,) becomes unavoidable. Numerous experiments have in fact also shown that if the mixture to be calcined is so composed as to exactly correspond to the formula $$2Al_2O_3 + 2Na_2SO_4 + C$$

the reaction will take place according to the formula $$2Al_2O_3 + 2Na_2SO_4 + C = 4AlNaO_2 + 2SO_2 + CO_2$$

and that no sulfid compound remains, so that the pollution of the aluminate lyes by soluble sulfur-sodium-iron compounds becomes an impossibility. As is to be seen from this equation, only the fourth part of the oxygen present in sulfate is to combine with carbon. The bauxite now employed by me contains about sixty per cent. of alumina and twenty-four per cent. of oxid of iron, which corresponds to the formula $$4Al_2O_3.Fe_2O_3,$$

and as the ferric oxid during the process of calcination is converted into ferrous oxid, therefore in calculating the amount of carbon the quantity of oxid of iron present and the possible quantity of moisture contained in the aluminous matter must be taken into account.

The whole process occurring during the calcination may be expressed by the following formula:

$$2(4Al_2O_3.Fe_2O_3) + 8Na_2SO_4 + 5C = 16AlNaO_2 + 4FeO + 5CO_2 + 8SO_2.$$

In practically carrying out the process it is necessary to take a quantity of alkaline sulfate which is equivalent to the amount of alumina, whereas the amount of carbon (used in form of coke, pit-coal, or wood-charcoal) is to correspond to only one-fourth or thereabout of the amount usually employed to completely reduce the sulfate. These constituent substances are finely comminuted, intimately mixed, and heated until red-hot. The sulfurous-acid gas during this operation escapes and is practically utilized in the known manner—for instance, for obtaining sulfates from chlorids, for the obtainment of sulfuric acid, &c. The product obtained after the calcination is finished is extracted by lixiviation.

Having now particularly described and ascertained the nature of my said invention and in what manner the same is to be performed, I declare that what I claim is—

1. The process of producing aluminates which consists in mixing aluminous matter and a sulfate with such an amount of carbon that only one-fourth of the oxygen present in the sulfate will be combined therewith, and calcining the mixture.

2. The process of producing aluminates which consists in calcining a mixture of an aluminous earth and a sulfate together with sufficient carbon to just reduce the ferric oxid and moisture plus one-fourth the amount of carbon necessary to combine with the oxygen in the sulfate in forming carbon dioxid.

3. The process of producing aluminates which consists in mixing aluminous matter with an alkaline sulfate with such an amount of carbon that only one-fourth of the oxygen in the alkaline sulfate will be combined therewith, and then calcining the mixture.

4. The process which consists in mixing bauxite with an alkaline sulfate and carbon in the proportions indicated by the formula $2(4Al_2O_3.Fe_2O_3) + 8Na_2SO_4 + 5C$ and calcining the mixture.

5. The process which consists in mixing finely-comminuted aluminous matter, and alkaline sulfate and carbonaceous matter, the proportions of the carbonaceous matter being such that only one-fourth the amount of carbon necessary to combine with the oxygen of the sulfate is added, then heating the mixture to red heat, and finally extracting the resultant aluminate by lixiviation.

In testimony whereof I have signed my name to this specification in the presence of two subscribing witnesses.

DONITRY ALEXANDROWITCH PÉNIAKOFF.

Witnesses:
GEO. W. ROOSEVELT,
GREGORY PHELAN.